United States Patent
Kono

(10) Patent No.: US 9,458,986 B2
(45) Date of Patent: Oct. 4, 2016

(54) LIGHTING UNIT

(71) Applicant: Stanley Electric Co., Ltd., Tokyo (JP)

(72) Inventor: Katsuhiko Kono, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 38 days.

(21) Appl. No.: 14/663,578

(22) Filed: Mar. 20, 2015

(65) Prior Publication Data

US 2015/0267895 A1    Sep. 24, 2015

(30) Foreign Application Priority Data

Mar. 24, 2014 (JP) ................. 2014-059632

(51) Int. Cl.
F21V 7/00 (2006.01)
F21V 5/04 (2006.01)
G02B 19/00 (2006.01)
F21Y 101/02 (2006.01)

(52) U.S. Cl.
CPC ............... *F21V 7/0091* (2013.01); *F21V 5/04* (2013.01); *G02B 19/0028* (2013.01); *G02B 19/0061* (2013.01); *F21Y 2101/02* (2013.01)

(58) Field of Classification Search
CPC ... F21V 7/0091; F21V 5/04; G02B 19/0028; G02B 19/0061; F21Y 2101/02
USPC ........................................ 362/300
See application file for complete search history.

(56) References Cited

U.S. PATENT DOCUMENTS 8,430,517 B2 * 4/2013 Tortora ................ G02B 6/002
                                                    362/23.09
2006/0274621 A1   12/2006 Nagabuchi

FOREIGN PATENT DOCUMENTS

JP       2006339121 A    12/2006

* cited by examiner

*Primary Examiner* — Anh Mai
*Assistant Examiner* — Hana Featherly
(74) *Attorney, Agent, or Firm* — Kenealy Vaidya LLP

(57) ABSTRACT

A lighting unit can project light in a linear fashion without enlarging a light guide body. The lighting unit can include an upward-directed LED and a light guide body. The light guide body can include: a light incident portion to receive light from the LED and collimate the incident light; a first reflecting surface provided to a front portion above the light incident portion, to reflect the entering light; second reflecting surfaces provided to a rearer portion than the first reflecting surface, configured to reflect the entering light toward respective sides of the lighting unit; and third reflecting surfaces located outside of the second reflecting surfaces in the left-to-right direction, to reflect the light from the second reflecting surfaces forward. The second reflecting surfaces are curved to direct the light radially, and the third reflecting surfaces are provided to extend more forward than the second reflecting surfaces.

8 Claims, 6 Drawing Sheets

LIGHTING UNIT

This application claims the priority benefit under 35 U.S.C. §119 of Japanese Patent Application No. 2014-059632 filed on Mar. 24, 2014, which is hereby incorporated in its entirety by reference

TECHNICAL FIELD

The presently disclosed subject matter relates to a lighting unit configured to project light through a light guide body that is illuminated in a line shape.

BACKGROUND ART

Various conventional lighting units, such as vehicle lighting units, have been known which can change the travelling direction of light from a light source, for example, vertically oriented, to be spread horizontally wide by a light guide body. This configuration can provide a horizontally elongated lighting unit that can project light through the elongated front surface of the light guide body such that the elongated light guide body is illuminated with the light in a line shape. This type of lighting unit can include those disclosed in Japanese Patent Application Laid-Open No. 2006-339121 (or US20060274621A1), for example.

FIGS. 1A and 1B illustrate one example of this conventional type of lighting unit. As illustrated in the drawings, the lighting unit can include a light source 8 oriented upward and a light guide body 9 configured to control the light emitted from the light source 8. The light guide body 9 can include a light incident portion 90 that faces to the light source 8, a first reflecting surface 91 and a pair of second reflecting surfaces 92, 92 that are located above the light incident portion 90, a pair of third reflecting surfaces 93, 93 that are located on respective sides of the lighting unit to correspond to the pair of second reflecting surfaces 92, 92, and a front surface 94 that is horizontally elongated. Among them, the first reflecting surface 91 can be located at a front position above the light incident portion 90, and can be configured to be an inclined plane directed forward and upward by an angle of 45 degrees. The pair of second reflecting surfaces 92, 92 can be configured to be bilaterally symmetric with respect to the horizontal center of the light incident portion 90. The pair of second reflecting surfaces 92, 92 can be configured to be an inclined plane directed forward and leftward or rightward, respectively, by an angle of 45 degrees.

In the lighting unit with this configuration, as illustrated in FIG. 1B, the light emitted from the light source 8 can be first incident on the light incident portion 90 of the light guide body 9 to enter the same while the light can be collimated. Part of the light on the front side can impinge on the first reflecting surface 91 and be reflected by the same forward while almost all the remaining part of the light can impinge on the pair of second reflecting surfaces 92, 92 and be reflected by the same and divided rightward and leftward. After that, the divided traveling light rays can impinge on the pair of third reflecting surfaces 93, 93 so as to be reflected by the same forward. The reflected light can be projected through the front surface 94 elongated in the right-to-left direction, thereby being projected forward while the front surface 94 can be illuminated with light as if it is a line-shaped lighting unit.

With the above-described conventional lighting unit, however, it is difficult to configure a more elongated front surface 94 of the light guide body 9 illuminated with light. This may be because the pair of second reflecting surfaces 92, 92 of the light guide body 9 can only reflect the light that has travelled from the light incident portion 90 while collimating the light.

A detailed description of the problems in association with the conventional lighting unit will be given with reference to FIGS. 2A and 2B. Even if the light guide body 9 is configured to make a front surface 94 longer by simply extending the front portion of the light guide body 9, the front portions of the third reflecting surfaces 93, 93 located forward of the second reflecting surfaces 92, 92 cannot receive the light as illustrated in FIG. 2A, whereby both ends of the front surface 94 in front of the respective front portions of the third reflecting surfaces 93, 93 become dark.

To cope with this defect, as illustrated in FIG. 2B, the positions of the first reflecting surface 91 and the pair of second reflecting surfaces 92, 92 as a whole can be moved forward. In this case, however, the rear portions of the third reflecting surfaces 93, 93 located rearward of the second reflecting surfaces 92, 92 cannot receive light. As a result, the inner portions of the front surface 94 in front of the rear portions of the third reflecting surfaces 93, 93 become dark.

If the light incident portion 90 is enlarged and the corresponding first reflecting surface 91 and the pair of second reflecting surfaces 92, 92 are also enlarged, the occurrence of the dark portions can be prevented. In this case, however, the light guide body 9 must be sized up, in particular, in the vertical direction, resulting in various other problems arising, such as deteriorated moldability, attenuation of light due to extended optical path length, etc. Thus, this countermeasure is not preferable.

SUMMARY

The presently disclosed subject matter was devised in view of these and other problems and features in association with the conventional art. According to an aspect of the presently disclosed subject matter, a lighting unit can project light in a linear fashion longer than the conventional lighting unit can, without enlarging the light incident portion of the light guide body.

According to another aspect of the presently disclosed subject matter, a lighting unit configured to project light in a projection direction (substantially in the front-to-rear direction) in a linear fashion elongated in a direction orthogonal to the projection direction, for example, in a right-to-left (horizontal) direction can include: a light source oriented in a first orthogonal direction substantially orthogonal to a front-to-rear direction; and a light guide body configured to receive light emitted from the light source and guide the light, so that the guided light can be projected through the light guide body and be directed forward. In this lighting unit, the light guide body can include:

a light incident portion located at a position facing to the light source, the light incident portion configured to receive light emitted from the light source and incident on the light incident portion and collimate the incident light substantially in parallel with the first orthogonal direction, so that the collimated incident light enters the light guide body;

a first reflecting surface provided to a front portion of a portion located in the first orthogonal direction of the light incident portion, the first reflecting surface internally reflecting part of the light entering the light guide body through the light incident portion on a front side forward;

a pair of second reflecting surfaces provided to a rear portion of the portion located in the first orthogonal direction of the light incident portion, the pair of second reflecting surfaces internally reflecting part of the light, which enters the light guide body through the light incident portion on a rearer side than the first reflecting surface, in a second orthogonal direction orthogonal to both the front-to-rear direction and the first orthogonal direction;

a pair of third reflecting surfaces provided to overlap with the first reflecting surface in the second orthogonal direction when viewed from its front side and correspond to the pair of second reflecting surfaces so as to be located outside of the respective second reflecting surfaces in the second orthogonal direction, the pair of third reflecting surfaces internally reflecting the light internally reflected by the corresponding second reflecting surfaces forward; and a light exiting surface located in front of the first reflecting surface and the pair of third reflecting surfaces, the light internally reflected by the first reflecting surface and the pair of third reflecting surfaces exiting therethrough and being projected forward, wherein the pair of second reflecting surfaces are configured to be curved so as to internally reflect the light from the light incident portion to direct the light substantially radially toward respective sides of the lighting unit in the second orthogonal direction, and both the pair of the third reflecting surfaces are configured to extend more forward than the pair of second reflecting surfaces.

According to still another aspect of the presently disclosed subject matter, the lighting unit with the above-mentioned configuration can be further configured such that at least one of the pair of second reflecting surfaces can internally reflect the light from the light incident portion such that the light internally reflected and directed more forward has a higher light intensity.

According to still another aspect of the presently disclosed subject matter, the lighting unit with any of the above-mentioned configurations can be further configured such that at least one of the pair of third reflecting surfaces can be configured by a plurality of third reflecting surfaces that form a continuous stepped surface together with step surfaces each extending in the second orthogonal direction, the continuous stepped surface being formed by alternately connecting the third reflecting surfaces and the step surfaces to each other and extending sideward and forward.

According to still another aspect of the presently disclosed subject matter, the lighting unit with any of the above-mentioned configurations can be further configured such that the first reflecting surface can be configured to be curved so as to internally reflect the light from the light incident portion to diffuse the light in the second orthogonal direction while directing the light forward.

According to the configuration made in accordance with principles of the presently disclosed subject matter, the light emitted from the light source can enter the light guide body through the light incident portion while being collimated by the light incident portion in the first orthogonal direction (for example, vertical direction). Then, a front-side portion of the light can be internally reflected by the first reflecting surface forward. On the other hand, a rear-side portion of the light can be internally reflected by the pair of second reflecting surfaces to be directed to respective sides of the lighting unit in the second orthogonal direction (for example, horizontal direction or left-to-right direction). The internally reflected light can be further internally reflected by the pair of third reflecting surfaces forward. The entire light reflected by the respective first, second, and third reflecting surfaces can be projected through the elongated light exiting surface, so that the lighting unit can project light in a linear fashion elongated in the direction orthogonal to the projection direction, or the second orthogonal direction.

In this case, the pair of second reflecting surfaces of the light guide body can be curved so as to internally reflect the light from the light incident portion to direct the light substantially radially toward respective sides of the lighting unit in the second orthogonal direction. Therefore, even when the pair of second reflecting surfaces internally reflect and direct the light to the front-side portions of the pair of third reflecting surfaces extending more forward than the pair of second reflecting surfaces, the light can be suitably controlled to travel through the light guide body by the reflection. According to the aspect of the presently disclosed subject matter, the lighting unit can project light in a linear fashion longer than the conventional lighting unit can, without enlarging the light incident portion of the light guide body.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to lighting units of the presently disclosed subject matter with reference to the accompanying drawings in accordance with exemplary embodiments.

Figure 1A:
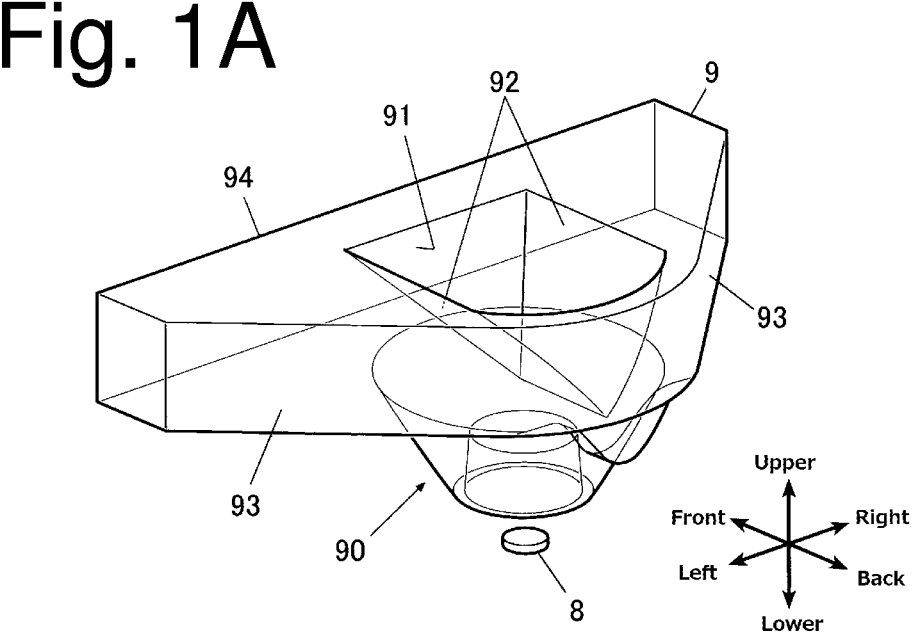
FIGS. 1A and 1B are a perspective view and a plan view of a conventional lighting unit, respectively.
Figure 1B:
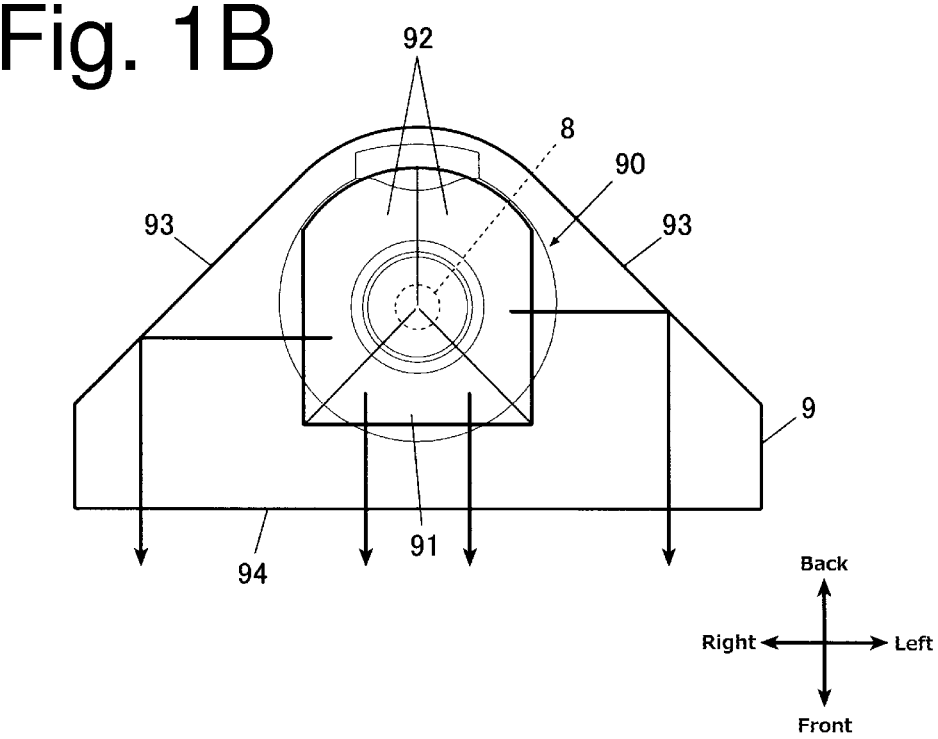
Figure 2A:
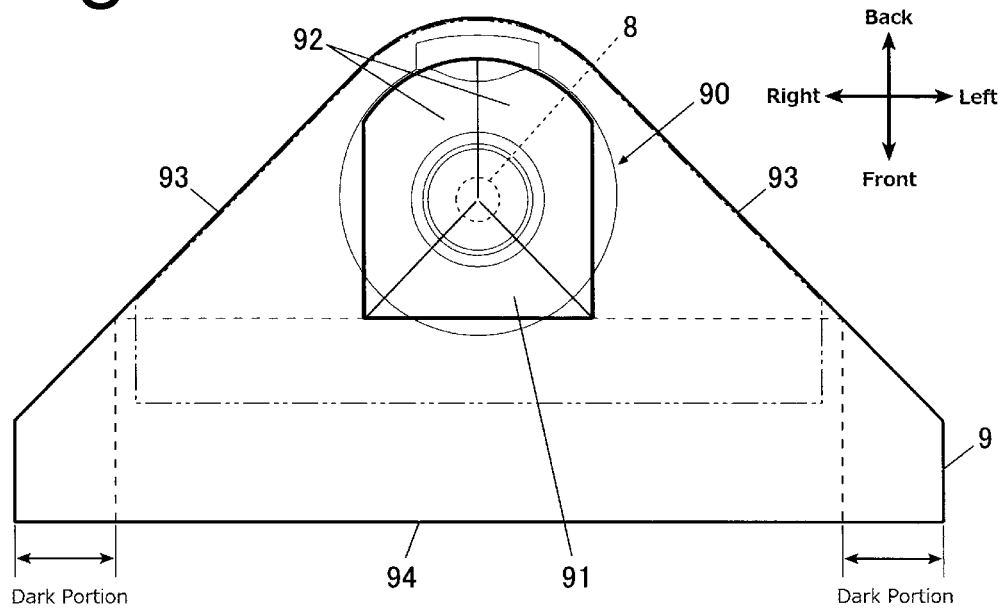
FIGS. 2A and 2B are each a plan view illustrating the problems in association with the conventional lighting unit.
Figure 2B:
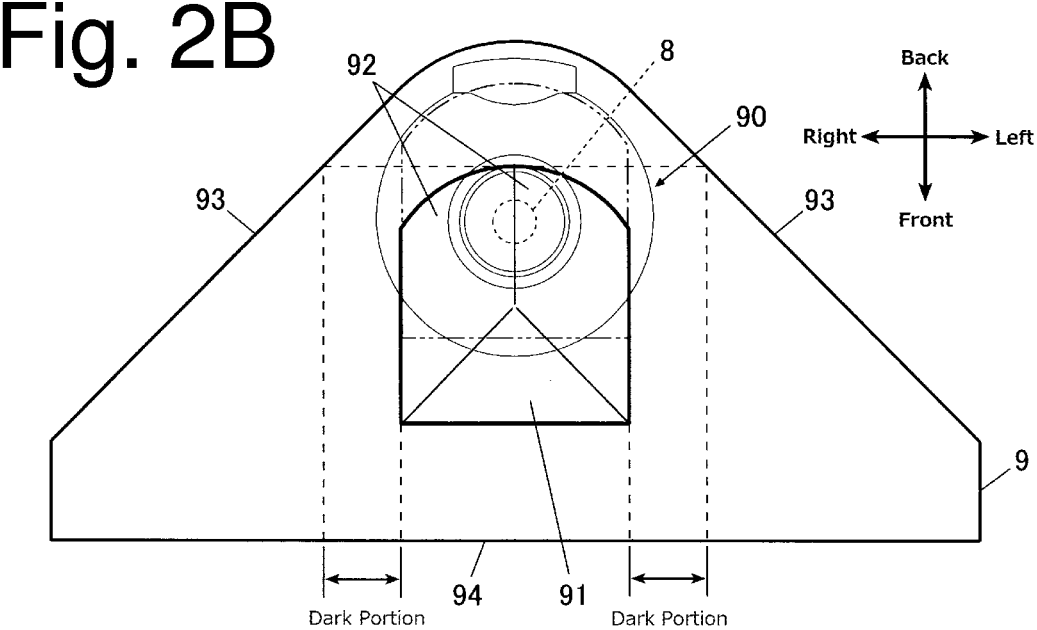
Figure 3:
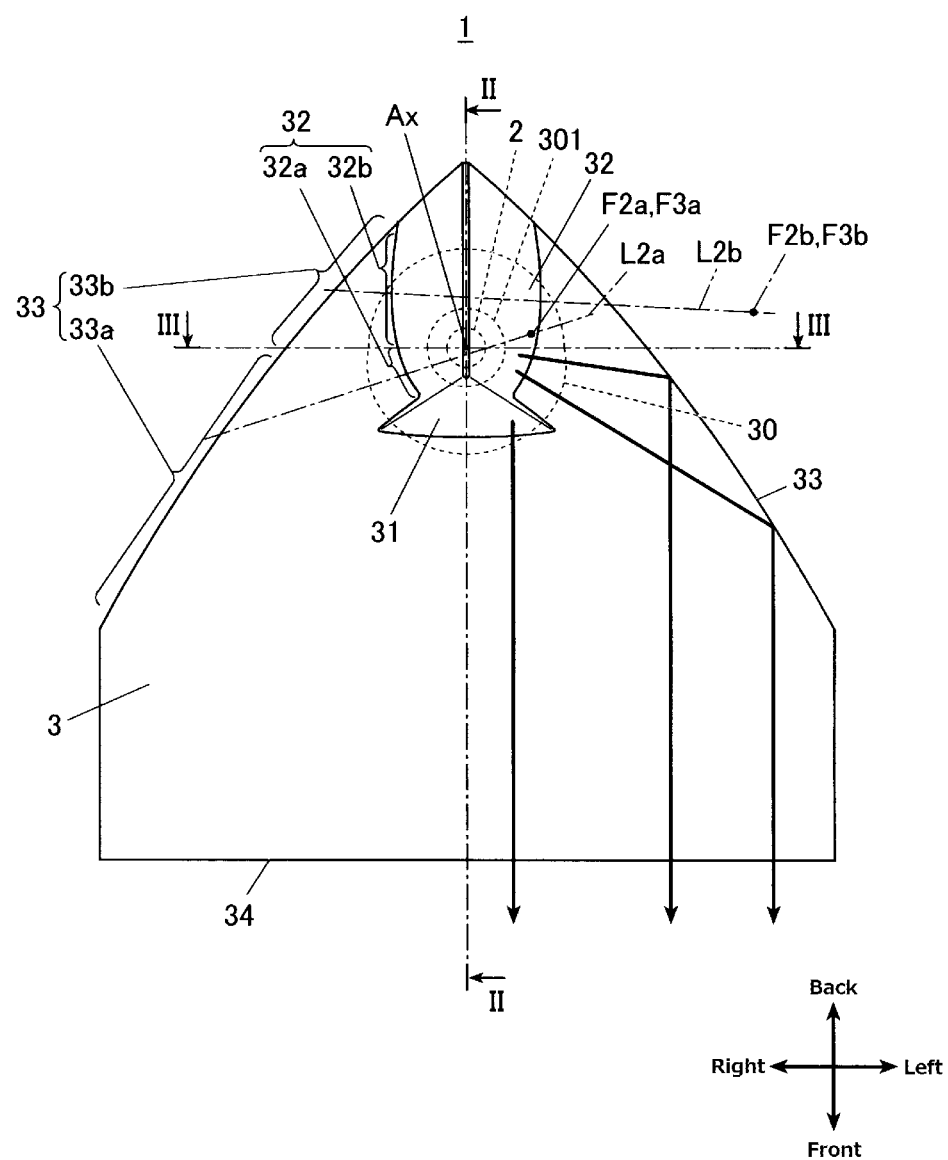
FIG. 3 is a plan view of a lighting unit of one exemplary embodiment made in accordance with the principles of the presently disclosed subject matter.
Figure 4:
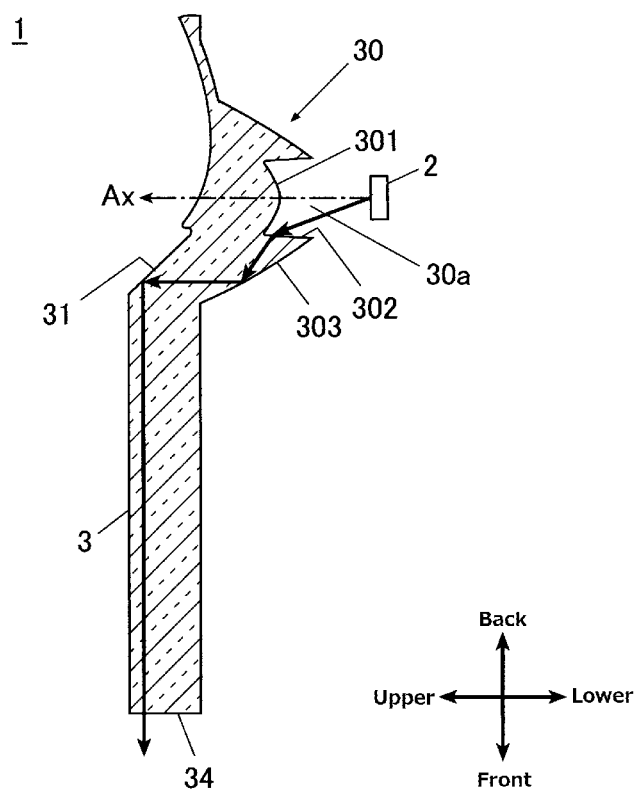
FIG. 4 is a cross-sectional view of FIG. 3 taken along II-II line.
Figure 5:
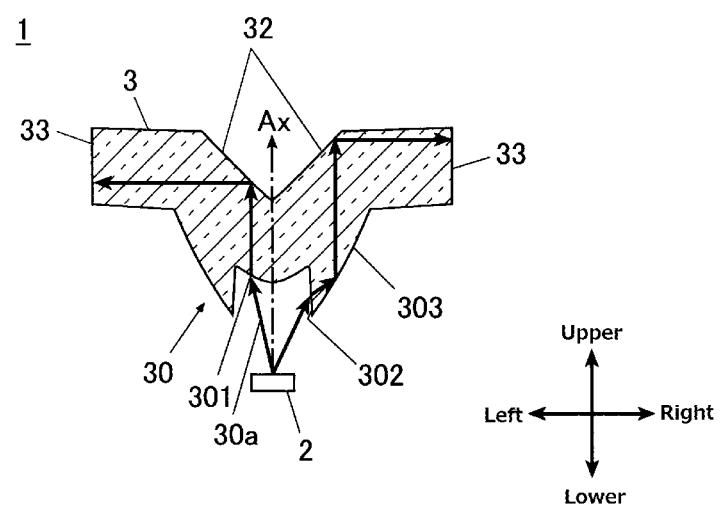
FIG. 5 is a cross-sectional view of FIG. 3 taken along III-III line.

FIG. 3 is a plan view of a lighting unit 1 of one exemplary embodiment made in accordance with the principles of the presently disclosed subject matter, and FIGS. 4 and 5 are cross-sectional views of FIG. 3 taken along II-II line and III-III line, respectively.

It should be noted that the "front (forward)," "back (rear, rearward)," "left," "right," "upper," and "lower (downward)" directions are meant to be directions based on the case where the lighting unit 1 has a light projecting direction being forward while the light source emits light upward unless otherwise specified.

As illustrated in FIGS. 3 to 5, the lighting unit 1 can include a light source 2, such as a light-emitting diode (LED, hereinafter which can be used as one example of the light source 2), and a light guide body 3 configured to be illuminated with light from the LED 2.

The LED 2 can have an optical axis Ax as the light emitting direction and be disposed so that the optical axis Ax is directed upward. The LED 2 can emit light upward and substantially radially with the optical axis Ax as a center.

The light source 2 can be any light source that can be used for illumination purpose such as a laser diode, etc. in addition to an LED according to the required specification as the lighting unit.

The light guide body 3 can be formed in a flat plate shape and located above the LED 2. The flat plate shape of the light guide body 3 can be configured to be narrowed rearward to the center when in a plan view while it may be bilaterally symmetric, as illustrated in FIG. 3. The light guide body 3 can be configured to include a light incident portion 30, a first reflecting surface 31, a pair of second reflecting surfaces 32, 32, a pair of third reflecting surfaces 33, 33, and a light exiting surface 34.

The light guide body 3 can be made of any material for use in forming an optical component, such as a glass material, a resin material, etc. with high light transmittance according to the required specification as the lighting unit.

The light incident portion 30 can be located on the bottom face of the light guide body 3 substantially at the rear center in the left-to-right direction. The light incident portion 30 can have a truncated conical shape projected downward with the optical axis Ax of the LED 2 being the rotational symmetric axis. An opening portion 30a open downward can be provided to the lower end of the light incident portion 30.

As illustrated in FIG. 4, The bottom of the opening portion 30a can be provided with a first light incident surface 301 to face to the LED 2. The first light incident surface 301 can be a convex shape (aspherical convex shape) projected downward with the optical axis Ax of the LED 2 being the rotational symmetric axis. The first light incident surface 301 can have a focal point located substantially at the LED 2, so that the light emitted from the LED 2 upward and impinging on the first light incident surface 301 can be collimated in a direction substantially parallel with the optical axis Ax to enter the light guide body 3.

The opening portion 30a can have an inner peripheral surface that serves as a second light incident surface 302, as illustrated in FIG. 4. Specifically, the second light incident surface 302 can be a substantially cylindrical surface extending from the lower peripheral edge of the first light incident surface 301 downward, so that the light emitted from the LED 2 upward and being directed sideward (not directed to the first light incident surface 301) can enter the light guide body 3 through the second light incident surface 302.

The light incident portion 30 can have an outer peripheral surface of the truncated conical shape, which serves as a light-incident-portion reflecting surface 303. Specifically, as illustrated in FIG. 4, the light-incident-portion reflecting surface 303 can be the truncated conical surface extending and being inclined from the tip periphery (lower peripheral edge) of the second light incident surface 302 upward and radially outward (away from the optical axis Ax). As a result of this shape profile, the light having entered the light guide body 3 through the second light incident surface 302 can be internally and totally reflected by the light-incident-portion reflecting surface 303 so that the reflected light can be aligned in parallel with the optical axis Ax.

With this configuration, the light emitted from the LED 2 can enter the light guide body 3 through the light incident portion 30 while being collimated in parallel with the optical axis Ax.

The first reflecting surface 31 can be formed in a portion of the upper surface of the light guide body 3 just above the light incident portion 30 on the front side thereof. Specifically, the first reflecting surface 31 can be configured to be an inclined plane directed forward and upward by an angle of about 45 degrees with respect to the plane orthogonal to the front-to-rear direction. Furthermore, the first reflecting surface 31 can be formed to be a triangular shape, when viewed from its front side, having three apexes including two top ends on the right and left sides and a lower end at the horizontal center in front of the optical axis Ax. In this configuration, the first reflecting surface 31 may preferably be formed to be curved in the front-to-rear direction rather than flat so as to be convex forward, as illustrated in FIG. 3. In the illustrated example, the curved convex shape can be confirmed as the curved upper edge of the first reflecting surface 31 in FIG. 3. With this shape profile, the first reflecting surface 31 can internally and totally reflect part of the light having entered the light guide body 3 through the light incident portion 30 on the front side while slightly diffusing the same in the left-to-right direction.

The pair of second reflecting surfaces 32, 32 can be formed in a portion of the upper surface of the light guide body 3 just above the light incident portion 30 on the rear side thereof. Specifically, the pair of second reflecting surfaces 32, 32 can be formed behind the first reflecting surface 31. The pair of second reflecting surfaces 32, 32 can be bilaterally symmetric reflecting surfaces with respect to the plane including the optical axis Ax and orthogonal to the left-to-right direction as a boundary face (symmetric face). With this shape profile, the pair of second reflecting surfaces 32, 32 can internally and totally reflect part of the light having entered the light guide body 3 through the light incident surface 30 on the rear side than that for the first reflecting surface 31, so that the light rays can be separately directed rightward and leftward with the optical axis Ax serving as a boundary.

Each of the second reflecting surfaces 32 can be curved so as to internally reflect the light from the light incident portion 30 to direct the same substantially radially. In the illustrated exemplary embodiment, the pair of second reflecting surfaces 32 are each configured to include two different paraboloidal surfaces joined. Specifically, each of the second reflecting surfaces 32 can be a surface including a front-side second reflecting surface 32a being a part of a paraboloidal surface and a rear-side second reflecting surface 32b being a part of a different paraboloidal surface, which are smoothly joined to each other.

The front-side second reflecting surface 32a can be a paraboloidal surface that is open obliquely rearward and upward with a perpendicular line L2a at a substantially center portion being slightly inclined forward and outward in plan view. The front-side second reflecting surface 32a can have a rear focal point F2a on the perpendicular line L2a.

On the other hand, the rear-side second reflecting surface 32b can be a paraboloidal surface that is open obliquely sideward and upward with a perpendicular line L2b at a substantially center portion being substantially parallel with the left-to-right direction in plan view. The rear-side second reflecting surface 32b can have a focal point F2b at a relatively apart position on the opposite side to the rear-side second reflecting surface 32b with respect to the above-described boundary face.

With this configuration, the second reflecting surfaces 32 according to the exemplary embodiment can internally reflect the light from the light incident portion 30 such that the light internally reflected and directed more forward has a higher light intensity and is directed substantially radially toward respective sides of the lighting unit in the left-to-right direction. Specifically, the second reflecting surfaces 32 can achieve the adjustment of the light intensity by, for example, configuring the surface to reflect more coarsely toward the nearer part of the third reflecting surface 33 (e.g., 33b or around) and more densely toward the farther part of the third reflecting surface 33 (e.g., 33a or around).

The pair of third reflecting surfaces 33, 33 can be part of the rear surface of the light guide body 3 and located at outer sides of the respective second reflecting surfaces 32, 32 in the left-to-right direction while corresponding to the respective second reflecting surfaces 32, 32. The pair of third reflecting surfaces 33, 33 can be bilaterally symmetric reflecting surfaces with respect to the above-described boundary face (symmetric face). The pair of third reflecting surfaces 33, 33 can be provided to slightly overlap with the first reflecting surface 31 in the left-to-right direction when viewed from its front side.

The third reflecting surfaces 33 can each be made of a surface that is positioned forward and away from the optical axis Ax in the left-to-right direction so as to internally and totally reflect the light from the corresponding second reflecting surface 32. In the illustrated exemplary embodiment, the pair of third reflecting surfaces 33 are each configured to include two different paraboloidal surfaces joined like the second reflecting surface 32. Specifically, each of the third reflecting surfaces 33 can be a surface including a front-side third reflecting surface 33a being a part of a paraboloidal surface and a rear-side third reflecting surface 33b being a part of a different paraboloidal surface, which are smoothly joined to each other.

The front-side third reflecting surface 33a can be a paraboloidal surface having a focal point F3a at or near the focal point F2a of the front-side second reflecting surface 32a. The paraboloidal shape of the front-side third reflecting surface 33a can be slightly inclined forward and projected outward in plan view.

The rear-side third reflecting surface 33b can be a paraboloidal surface having a focal point F3b at or near the focal point F2b of the rear-side second reflecting surface 32b. The paraboloidal shape of the rear-side third reflecting surface 33b can be slightly inclined forward and projected outward in plan view.

With this configuration, the pair of the third reflecting surfaces 33, 33 according to the exemplary embodiment can internally and totally reflect the light, which have been internally reflected by the corresponding second reflecting surfaces 32, 32 outward in the left-to-right direction, forward substantially in parallel with the front-to-rear direction.

The light exiting surface 34 can be a horizontally elongated front surface of the light guide body 3 extending over and in front of the first reflecting surface 31 and the pair of third reflecting surfaces 33, 33. The light exiting surface 34 can allow the light having been internally reflected by the first reflecting surface 31 and the pair of third reflecting surfaces 33, 33 to be projected therethrough.

According to the lighting unit 1 with the configuration made in accordance with principles of the presently disclosed subject matter, the light emitted from the LED 2 can enter the light guide body 3 through the light incident portion 30 while being collimated by the same in the vertical direction. Then, a front-side portion of the light can be internally reflected by the first reflecting surface 31 forward. On the other hand, a rear-side portion of the light can be internally reflected by the pair of second reflecting surfaces 32, 32 to be directed towards respective sides of the lighting unit in the left-to-right direction. The internally reflected light can be further internally reflected by the pair of third reflecting surfaces 33, 33 forward. The entire light reflected by the respective first, second, and third reflecting surfaces can be projected through the light exiting surface 34, so that the lighting unit 1 can project light in a linear fashion elongated in the left-to-right direction.

At this time, the pair of second reflecting surfaces 32, 32 of the light guide body 3 can be formed in a curved shape so as to internally reflect the light from the light incident portion 30 to direct the light substantially radially toward respective sides of the lighting unit in the left-to-right direction. Therefore, even when the pair of second reflecting surfaces 32, 32 internally reflect and direct the light to the front-side portions of the pair of third reflecting surfaces 33, 33 extending more forward than the pair of second reflecting surfaces 32, 32, the light can be suitably controlled to travel through the light guide body 3 by the reflection.

Consequently, the lighting unit 1 can project light in a linear fashion longer than the conventional lighting unit can, without the necessity of enlarging the light incident portion 30 of the light guide body 3.

Furthermore, in the conventional lighting unit, the light projected through the light exiting surface of the light guide body may be affected by the internal reflection at the light incident portion, the difference in optical path length within the light guide body, resulting in the decrease of light intensity toward respective ends thereof. However, the lighting unit 1 according to the present exemplary embodiment can suppress such a decrease of light intensity at the light exiting surface 34 by configuring the light guide body 3 such that the pair of second reflecting surfaces 32, 32 can internally reflect the light from the light incident portion 30 such that the light internally reflected and directed more forward has a higher light intensity.

In the above-described exemplary embodiment, each of the second reflecting surfaces 32, 32 can be formed from two paraboloidal surfaces smoothly jointed to each other, but it is not limitative. Each of the second reflecting surfaces 32, 32 may be formed from a single curved surface or three or more curved surfaces jointed smoothly to each other, so long as the formed second reflecting surface 32 can serve to internally and totally reflect the light from the light incident portion 30 in a controlled manner as described above.

Figure 6:
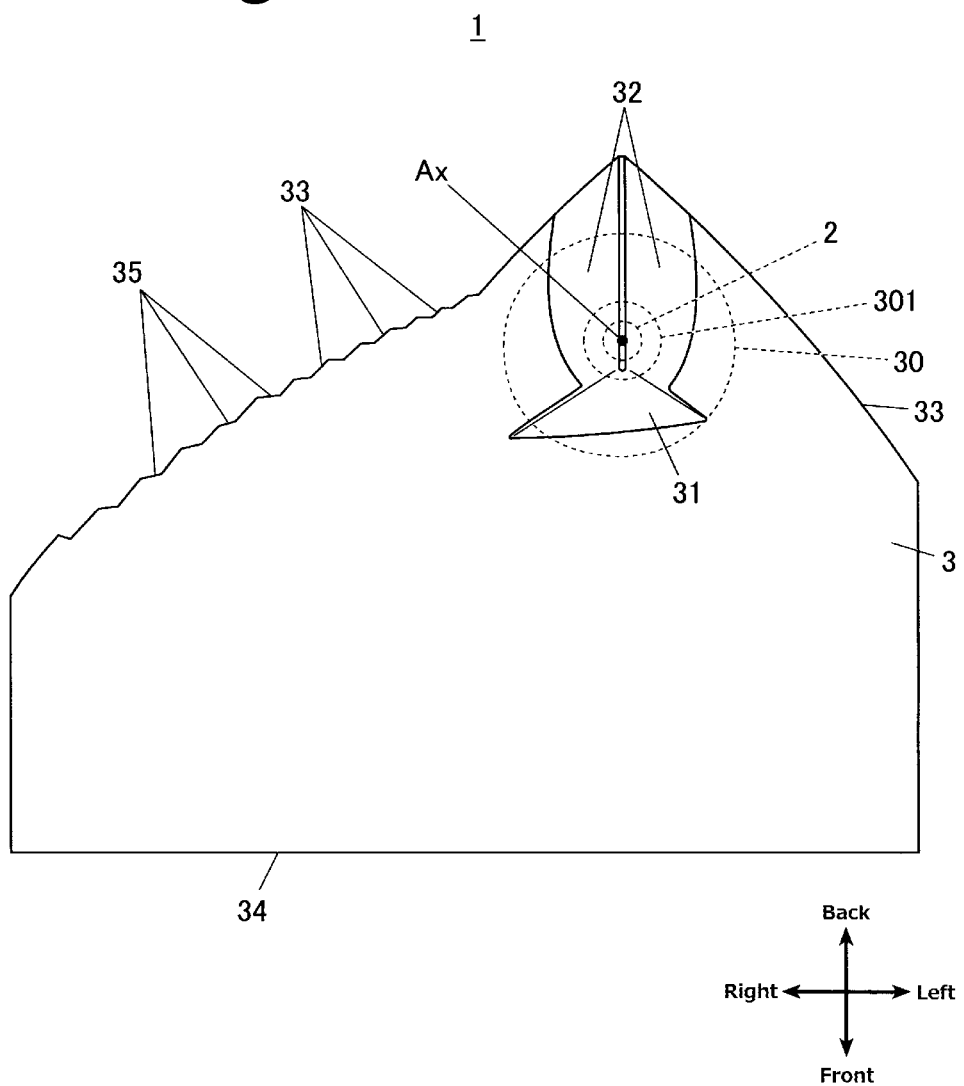
FIG. 6 is a diagram for illustrating another exemplary embodiment of the lighting unit made in accordance with the principles of the presently disclosed subject matter.

Next, with reference to FIG. 6, another exemplary embodiment of the lighting unit 1 will be described. In the previous exemplary embodiment, each of the third reflecting surfaces 33, 33 can be formed from two paraboloidal surfaces smoothly jointed to each other, but it is not limitative. Each of the third reflecting surfaces 32, 32 may be formed from a single flat or curved surface or three or more flat or curved surfaces jointed smoothly to each other, so long as the formed third reflecting surface 33 can serve to internally and totally reflect the light from the corresponding second reflecting surface 32 forward in a controlled manner as described above. FIG. 6 is a diagram for illustrating another exemplary embodiment of the lighting unit 1 with different third reflecting surfaces 33. As illustrated on the left side of the lighting unit 1 in FIG. 6, the third reflecting surface 33 can be configured by a plurality of third reflecting surfaces 33 that can form a continuous stepped reflecting surface together with step surfaces 35 each extending in the left-to-right direction. The plurality of third reflecting surfaces 33 and the step surfaces 35 can be alternately jointed to each other to form the entire third reflecting surface 33 extending sideward and forward. The third reflecting surface 33 with this configuration can finely adjust the amount of light reflected by the third reflecting surface 33 and the direction thereof, so that the light exiting surface 34 can be made to have uniform luminance.

Incidentally, the pair of second reflecting surfaces 32, 32 and the pair of third reflecting surfaces 33, 33 each may not be symmetric as illustrated in FIG. 6 on the right side with respect to the left side.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting unit configured to project light in a projection direction in a linear fashion elongated in a direction orthogonal to the projection direction, the lighting unit comprising:
   a light source oriented in a first orthogonal direction substantially orthogonal to a front-to-rear direction; and
   a light guide body configured to receive light emitted from the light source and guide the light, so that the guided light can be projected through the light guide body and be directed forward,
   the light guide body including:
      a light incident portion located at a position facing to the light source, the light incident portion configured to receive the light emitted from the light source and incident on the light incident portion and collimate the incident light substantially in parallel with the first orthogonal direction, so that the collimated incident light enters the light guide body;
      a first reflecting surface provided to a front portion of a portion located in the first orthogonal direction of the light incident portion, the first reflecting surface internally reflecting part of the light entering the light guide body through the light incident portion on a front side forward;
      a pair of second reflecting surfaces provided to a rear portion of the portion located in the first orthogonal direction of the light incident portion, the pair of second reflecting surfaces internally reflecting part of the light, which enters the light guide body through the light incident portion on a rearer side than the first reflecting surface, in a second orthogonal direction orthogonal to both the front-to-rear direction and the first orthogonal direction;
      a pair of third reflecting surfaces provided to overlap with the first reflecting surface in the second orthogonal direction when viewed from its front side and correspond to the pair of second reflecting surfaces so as to be located outside of the respective second reflecting surfaces in the second orthogonal direction, the pair of third reflecting surfaces internally reflecting the light internally reflected by the corresponding second reflecting surfaces forward; and
      a light exiting surface located in front of the first reflecting surface and the pair of third reflecting surfaces, the light internally reflected by the first reflecting surface and the pair of third reflecting surfaces exiting therethrough and being projected forward, wherein
   the pair of second reflecting surfaces are configured to be curved so as to internally reflect the light from the light incident portion to direct the light substantially radially toward respective sides of the lighting unit in the second orthogonal direction, and
   both the pair of the third reflecting surfaces are configured to extend more forward than the pair of second reflecting surfaces.

2. The lighting unit according to claim 1, wherein at least one of the pair of second reflecting surfaces is configured to internally reflect the light from the light incident portion such that the light internally reflected and directed more forward has a higher light intensity.

3. The lighting unit according to claim 2, wherein at least one of the pair of third reflecting surfaces is configured by a plurality of third reflecting surfaces that form a continuous stepped surface together with step surfaces each extending in the second orthogonal direction, the continuous stepped surface being formed by alternately connecting the third reflecting surfaces and the step surfaces to each other and extending sideward and forward.

4. The lighting unit according to claim 3, wherein the first reflecting surface is configured to be curved so as to internally reflect the light from the light incident portion to diffuse the light in the second orthogonal direction while the first reflecting surface directs the light forward.

5. The lighting unit according to claim 2, wherein the first reflecting surface is configured to be curved so as to internally reflect the light from the light incident portion to diffuse the light in the second orthogonal direction while the first reflecting surface directs the light forward.

6. The lighting unit according to claim 1, wherein at least one of the pair of third reflecting surfaces is configured by a plurality of third reflecting surfaces that form a continuous stepped surface together with step surfaces each extending in the second orthogonal direction, the continuous stepped surface being formed by alternately connecting the third reflecting surfaces and the step surfaces to each other and extending sideward and forward.

7. The lighting unit according to claim 6, wherein the first reflecting surface is configured to be curved so as to internally reflect the light from the light incident portion to diffuse the light in the second orthogonal direction while the first reflecting surface directs the light forward.

8. The lighting unit according to claim 1, wherein the first reflecting surface is configured to be curved so as to internally reflect the light from the light incident portion to diffuse the light in the second orthogonal direction while the first reflecting surface directs the light forward.

* * * * *